United States Patent Office 3,097,327
Patented July 9, 1963

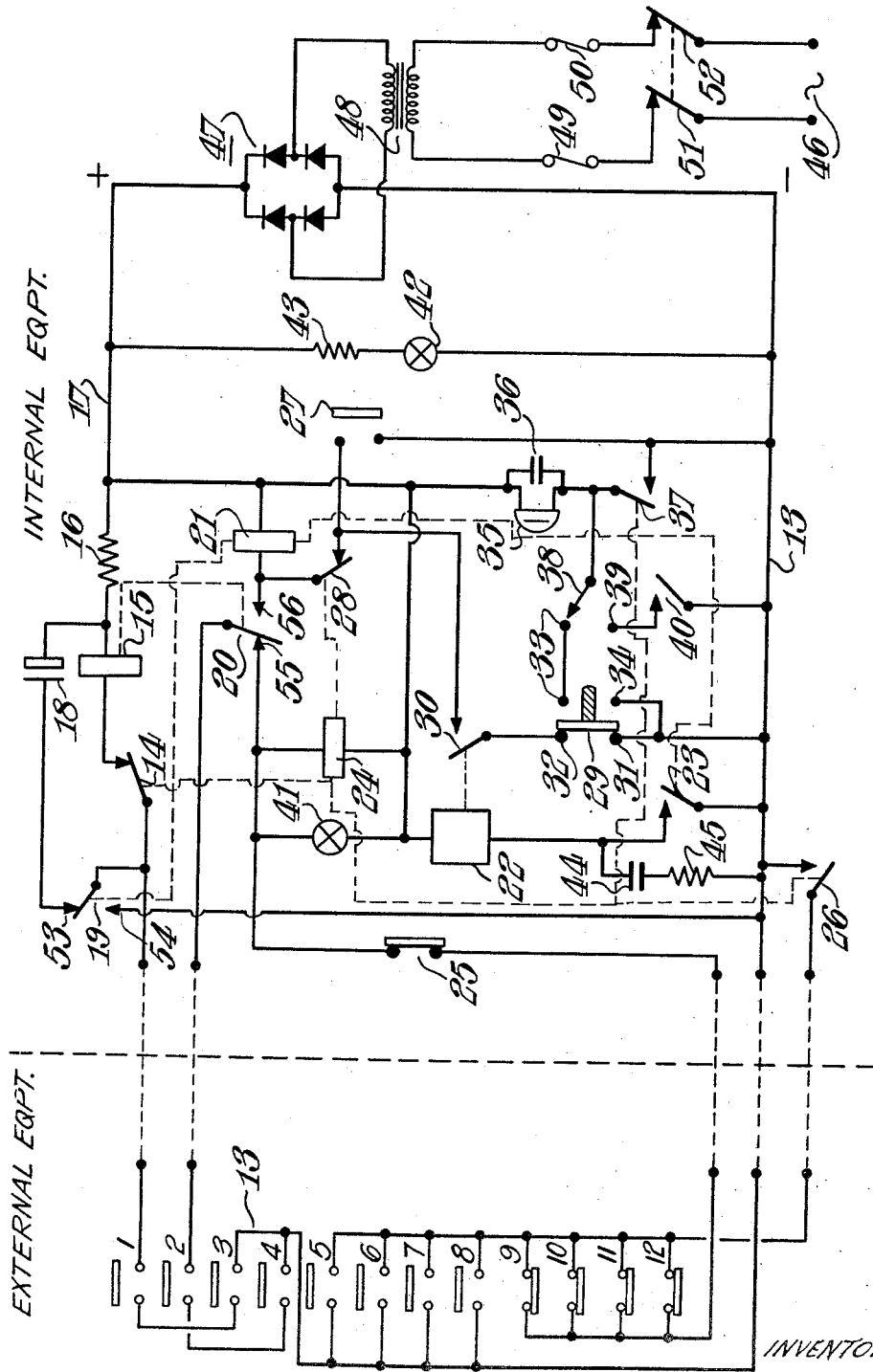

3,097,327
ACTUATOR FOR ELECTRICALLY OPERABLE DEVICE
James Herbert Bloor and Frederick George Chandler, Basingstoke, England, assignors to United Kingdom Atomic Energy Authority, London, England
Filed Feb. 2, 1959, Ser. No. 790,620
Claims priority, application Great Britain Feb. 8, 1958
5 Claims. (Cl. 317—134)

This invention relates to actuators for electrically operable devices. By means of the invention it is possible to ensure that the device is actuated only when the correct sequence of switching operations has been chosen, and furthermore the sequence must be used within an arbitrarily fixed time.

The invention consists in an actuator for an electrically operable device, which actuator comprises two electrical circuits, the first circuit comprising in series a relay connected to a first switching means and having an operation-extender connected across it, and the second circuit comprising a contact connected to a second switching means and movable, by operation of the relay, from a first position to a second position to allow current to pass through the electrically operable device.

The function of the operation-extender connected across the relay is to extend the time of operation of the relay so that the relay continues to operate after the switch in the first circuit has been opened. The operation-extender may be a mechanically operated device. For example, it may be a flywheel which is set rotating by opening of the switch and which closes a contact for some period of its rotation so that current is supplied to the relay for a short time, or it may be a solenoid operated by closure of the switch to hold up a weight which is arranged to fall slowly when the switch is opened again and which allows current to pass through the relay until the falling is completed.

The operation-extender is preferably a condenser and it can be made up of more than one condenser arranged in parallel so that the extent of the time extension can be varied as desired.

The two switching means can each be a single switch or a number of switches in series, or they can each be a switch operated by a telephone dial. The switches may be double switches which operate to close a circuit comprising a second electrically operated device across which is connected a motor circuit so that closure of the switch causes the second device to operate, and the operation of the device continues after the switch is re-opened. This second device can be a warning device, for example a bell, which would indicate immediately that an attempt was being made to operate the actuator. If desired any or all of the switches whose operation is not necessary for the working of the actuator can be connected in parallel to a second relay to form a third circuit. The second relay can operate to close a contact in a motor circuit connected across it so that the relay will continue to operate until the motor circuit is reset, and the second relay can operate to open a contact so that no current can pass through the electrically operable device.

If desired the contact of the second circuit when in the first position can be connected to the second relay.

A preferred embodiment of the invention is illustrated in the accompanying drawing which is a circuit diagram of an actuator for a solenoid which opens a door lock.

In the drawing switches 1 and 3 are connected in series in a circuit which comprises a negative lead 13, switches 1 and 3, a contact 14, a relay 15, a resistance 16 and a positive lead 17. Relay 15 has connected across it a 500 µf. condenser 18 in series with a contact 19.

Switches 2 and 4 are connected in series in a circuit which comprises the negative lead 13, switches 2 and 4, a contact 20 operable by relay 15, a relay 21 which serves to operate contact 19, and the positive lead 17. The lead 17 is connected directly to a solenoid 22 having a contact 23 operable by the relay 21, the contact 23 being connected directly to the negative lead 13. Switches 2 and 4 are also connected in series in an alternative circuit which comprises the negative lead 13, switches 2 and 4, contact 20 and a relay 24 connected directly to the positive lead 17. Relay 24 can operate to open contact 14. Relay 24 forms part of a circuit which comprises the negative lead 13, switches 5, 6, 7 and 8 connected in parallel, switches 9, 10, 11 and 12 which are connected in parallel and are normally closed, switch 25 which is normally closed, relay 24 and positive lead 17.

A motor circuit is provided for relay 24. This circuit comprises negative lead 13, a contact 26 operable by relay 24, switches 9, 10, 11, 12 and 25, relay 24 and positive lead 17. Switches 1 to 12 have spring actions to hold them in the illustrated positions.

Current can reach relay 21, when desired, through a circuit which comprises the negative lead 13, a switch 27, a contact 28 operable by relay 24, relay 21 and positive lead 17.

A motor circuit is provided for relay 21. This circuit comprises negative lead 13, a mechanically operated switch 29, a contact 30 operable by relay 21, contact 28, relay 21 and positive lead 17. Switch 29 can connect terminals 31 and 32 or terminals 33 and 34.

An alarm bell 35 in parallel with a condenser 36 is connected across leads 13 and 17 in series with a contact 37 operable by relay 24. A manual switch 38 can connect the alarm bell 35 either to terminal 33 or to terminal 39. Terminal 33 can be connected to negative lead 13 via switch 29 when switch 29 is operated. Terminal 39 can be connected to negative lead 13 via a contact 40 operable by relay 21. A warning light 41 is connected across relay 21, and a warning light 42 and a resistance are connected across leads 13 and 17.

A 2 µf. condenser 44 is connected on one side to the solenoid 22, and on the other side to lead 13 via a 10Ω resistance 45.

Leads 13 and 17 are connected to mains electricity 46 via a rectifier 47, a transformer 48 which transforms the mains voltage down to 30 volts, switches 49 and 50 and ganged switches 51 and 52. Contact 20 is provided with two terminals 55 and 56 connected to solenoid 24 and relay 21 respectively. Contact 19 is provided with two terminals 53 and 54 connected to condenser 18 and lead 13 respectively.

The operation of the circuit illustrated in which the solenoid is used to withdraw the bolt of a door lock will now be described.

Switches 1 and 3 are pressed, thus energising relay 15 and charging condenser 18 via contacts 14 and 19 respectively. Relay 15 operates contact 20 and moves it from terminal 55 to terminal 56. The operation of relay 15 is extended for about half a second after either of switches 1 and 3 is opened again by the charge in the condenser 18.

Switches 2 and 4 are pressed, thus energising relay 21 via contact 20. Relay 21 operates to close contact 23, thus energizing solenoid 22 to close contact 30, this holding relay 21 in operation, to move contact 19 from terminal 53 to terminal 54, thus disconnecting the condenser 18 and holding relay 15 in operation, and to close contact 40.

If switch 38 is connected to terminal 39 then closure of contact 40 will cause alarm bell 35 to ring. If switch 38 is connected to terminal 33 then movement of switch 29 to connect terminals 33 and 34 will cause bell 35 to ring.

Energising the solenoid 22 causes the lock bolt to be withdrawn and the opening of the door mechanically moves switch 29 from connecting terminals 31 and 33 to connecting terminals 33 and 34. The disconnection of terminals 31 and 32 cuts current off from the relay 21 (since switches 2 and 4 will have now sprung open again) and so reverses the settings of contacts 19, 23, 30 and 40. Closure of the door reconnects terminals 31 and 32 and completes the returning of the circuit to its original setting. The door can be opened from inside by pressing switch 27.

Energizing of the solenoid 22 can be prevented by closing any of switches 5 to 8 or by closing switches 2 and 4 when contact 20 is connected to terminal 55. When one of these switches is closed relay 24 is energized and operates to close contacts 26 and 37 and to open contacts 14 and 28. The closure of contact 26 allows current to reach the relay 24 via switches 9 to 12 and switch 25 and so keeps it energized. Closure of contact 37 causes the alarm bell 35 to ring. The opening of contact 14 prevents current reaching relay 15, and the opening of contact 28 prevents opening the door when switch 27 is pressed.

The operation of relay 24 can be stopped by pressing all switches 9 to 12 which are outside the door or by pressing switch 22 which is inside.

The action of relay 15 is slower than the action of relay 24 because of the effect of the resistance 16 and the condenser 18. Therefore the solenoid will not be energised if all switches 1 to 8 are pressed simultaneously.

We claim:

1. An electric combination actuator for a mechanical member comprising at least one switch connected in series with a relay, a capacitor connected across said relay, an automatic switch operable by said relay, a contact arm in said automatic switch movable from a first contact to a second contact, at least one switch connected in series with said contact arm, a magnetic coil means connected to be energized when current passes through said second contact, a self-holding circuit for said magnetic coil means, a self-holding circuit for said relay adapted to be energized when current passes through said second contact, a mechanical member movable from a first position to a second position by said magnetic coil means, a blocker relay connected to said first contact for preventing energization of the magnetic coil means, an additional self-holding circuit for said blocker relay, and a plurality of switches connected in parallel with each other and connected to said blocker relay.

2. An electric combination actuator as claimed in claim 1 in which at least one switch set with its closed contacts is connected in the self-holding circuit for the said blocker relay whereby opening of the contacts of the switch de-energizes said self-holding circuit.

3. An electric combination actuator for a mechanical member comprising at least one switch connected in series with a first relay, a capacitor connected across said first relay, an automatic switch operable by said first relay, a contact arm in said automatic switch movable from a first contact to a second contact, at least one switch connected in series with said contact arm, a second relay connected to said second contact, a self-holding circuit for said second relay, a magnetic coil means connected to be energized when current passes through said second contact, a self-holding circuit for said magnetic coil means, a self-holding circuit for said first relay adapted to be energized when current passes through said second contact, a mechanical member movable from a first position to a second position by said magnetic coil means, a second automatic switch operable by said second relay to energize said magnetic coil means, a blocker relay connected to said first contact for preventing energization of the magnetic coil means, a self-holding circuit for said blocker relay, and a plurality of switches arranged in parallel and connected to said blocker relay.

4. An electric combination actuator as claimed in claim 3 in which at least one switch set with its closed contacts is connected in the self-holding circuit for the said blocker relay whereby opening of the contacts of the switch de-energizes said self-holding circuit.

5. An electric combination actuator for a mechanical member comprising at least one switch connected in series with a relay, a capacitor connected across said relay, an automatic switch operable by said relay, a contact arm in said automatic switch movable from a first contact to a second contact, at least one switch connected in series with said contact arm, a magnetic coil connected to be energized when current passes through said second contact, a self-holding circuit for said magnetic coil, a self-holding circuit for said relay adapted to be energized when current passes through said second contact, a switch actuable by movement of the mechanical member to its second position whereby the said self-holding circuits for the said relay and the said magnetic coil are deenergized, a blocker relay connected to said first contact for preventing energization of the magnetic coil, a self-holding circuit for the said blocker relay, and a plurality of switches arranged in parallel and connected to said blocker relay.

References Cited in the file of this patent

UNITED STATES PATENTS

| | | |
|---|---|---|
| 1,283,845 | Marchant | Nov. 5, 1918 |
| 1,433,543 | Garrison | Oct. 31, 1922 |
| 1,905,965 | Leschke | Apr. 25, 1933 |
| 2,182,637 | Marbury | Dec. 5, 1939 |
| 2,436,809 | Joel | Mar. 2, 1948 |
| 2,519,569 | Handschin | Aug. 22, 1950 |